Patented June 21, 1932

1,863,745

UNITED STATES PATENT OFFICE

OTTO ERNST, KURT SPONSEL, AND GERHARD BALLE, OF HOCHST-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF PREPARING CELLULOSE DERIVATIVES FROM ALKALI CELLULOSE IN THE FORM OF PULP BOARDS BY MEANS OF ESTERIFYING AND ETHERIFYING AGENTS IN THE GASEOUS STATE

No Drawing. Application filed August 1, 1927, Serial No. 210,013, and in Germany August 6, 1926.

The present invention relates to a process of preparing cellulose derivatives from alkali cellulose in the form of pulp-boards; more particularly it relates to a process of preparing esters and ethers of cellulose by utilizing the esterifying and etherifying agents in the gaseous state.

We have found that cellulose esters and ethers can be prepared in an advantageous manner by causing a compound of the group including the etherifying and esterifying agents to act in the gaseous state upon a squeezed out alkali cellulose in the pulp-board or paper form which it is marketed, or which can be easily prepared by means of a cellulose hydro-extractor. This result could not be expected, nor could it be anticipated that the esterification or etherification with gaseous agents would have a sufficiently intensive action on coherent alkali cellulose pulp-boards, so as to ensure that they are esterified and etherified in the same degree as when using a finely disintegrated alkali cellulose. It is quite evident that the said process offers great advantages over the processes hitherto in use, because in our new process the apparatuses, in which the reactions are carried out, are more efficient and because, when employing the commercial paper-boards and disintegrating operation which requires a long time and great expense is thereby saved.

For the purpose of improving the permeability of the boards, it has proved to be advantageous to isolate the board-layers by interstices which can, for instance, be done by interposing wire nettings between the layers. The preliminarily prepared cellulose boards should preferably be in a homogeneous condition.

The following examples serve to illustrate our invention but they are not intended to limit it thereto:

(1) For the manufacture of ethyl cellulose, cellulose pulp-boards are steeped in a caustic soda solution of 70% strength, which is preferably done in the heat and in a vacuum, whereupon the material is squeezed out so that its weight amounts to 2½ times the original weight of the cellulose. After having interposed wire-nettings between the layers of the material and placed them into a bomb, the material is ethylated at 100° C. under 5 atmospheres pressure for about 12 hours with ethyl chloride gas. The product, after being washed and dried, is uniformly ethylated. It dissolves to a clear and viscous solution in mixtures of solvents, in alcohol, benzene, acetic acid, acetates and other organic solvents.

(2) A roll of cellulose weighing 100 kg. is continuously steeped at 55° C. in a caustic soda solution of 60% strength, squeezed out on a rolling frame so that its weight is reduced to 250 kg. and wound up on a winding trestle together with a wire-netting cloth. The roll thus obtained is placed into the vessel, wherein the methylating operation is to be performed, and methylated for 8 hours at 70° C. under 5 atmospheres pressure by means of methyl chloride gas. The product is washed with hot water and dried at 95° C.

The final product thus obtained dissolves in a mixture of alcohol with benzene (1:1) to a clear and viscous solution, likewise in ice-cold water.

(3) Some cellulose pulp-board is steeped in a caustic soda solution containing 18–22% of NaOH, squeezed out so that its weight is reduced to 2½ to 3 times the original weight of the cellulose, and after having allowed the material to ripen for a sufficient time and interposed wire-nettings, it is placed into the vessel wherein it is to be treated further. There is then passed at about 20–25° C. a stream of gaseous carbon disulfide through the last mentioned vessel until the formation of the xanthogenate is complete. The carbon disulfide may, if required, be diluted with an indifferent gas.

(4) Vapors of lauric acid chloride are caused to act upon alkali cellulose, prepared according to Example 1; during the esterifying operation the temperature is kept at about 100° C. by the circulation of nitrogen. The lauric acid ester cellulose thus obtained is soluble in glacial acetic acid, benzene, and hydrocarbon chlorides.

We claim:
1. A process for the manufacture of cellu- lose derivatives of the group consisting of cellulose ethers and esters which comprises causing an agent of the group consisting of esterifying and etherifying agents to act in the gaseous state upon an alkali cellulose in the form of a pulp board.

2. A process for the manufacture of cellulose derivatives of the group consisting of cellulose ethers and esters which comprises causing an agent of the group consisting of esterifying and etherifying agents to act in the gaseous state upon an alkali cellulose in the form of a pulp-board, care being taken that the board layers are isolated from each other by interstices.

In testimony whereof, we affix our signatures.

OTTO ERNST.
KURT SPONSEL.
GERHARD BALLE.